United States Patent
Kim et al.

(10) Patent No.: US 10,684,603 B2
(45) Date of Patent: Jun. 16, 2020

(54) DYNAMICALLY CONTROLLED SCREW-DRIVEN EXTRUSION

(71) Applicant: BUCKNELL UNIVERSITY, Lewisburg, PA (US)

(72) Inventors: Charles John Kim, Lewisburg, PA (US); Samuel Thomas Pratt, Hudson, OH (US)

(73) Assignee: BUCKNELL UNIVERSITY, Lewisburg, PA (US)

(*) Notice: Subject to any disclaimer, the term of this patent is extended or adjusted under 35 U.S.C. 154(b) by 1087 days.

(21) Appl. No.: 14/994,540

(22) Filed: Jan. 13, 2016

(65) Prior Publication Data

US 2016/0200024 A1 Jul. 14, 2016

Related U.S. Application Data (60) Provisional application No. 62/102,795, filed on Jan. 13, 2015.

(51) Int. Cl.
*B29C 48/92* (2019.01)
*B29C 48/255* (2019.01)
(Continued)

(52) U.S. Cl.
CPC .......... *G05B 19/188* (2013.01); *B29C 48/255* (2019.02); *B29C 48/2522* (2019.02);
(Continued)

(58) Field of Classification Search
CPC .............. B29C 48/252; B29C 48/2522; B29C 48/2526; B29C 48/255; B29C 48/288;
(Continued)

(56) References Cited

U.S. PATENT DOCUMENTS 2,791,802 A * 5/1957 Weber ...................... D01D 1/04
  425/208
4,154,535 A * 5/1979 Maillefer .............. B29C 48/875
  366/79

(Continued)

FOREIGN PATENT DOCUMENTS

CN 103146164 6/2013
CN 203371789 1/2014
(Continued)

OTHER PUBLICATIONS

JP 01-317736-A, Dec. 1989, machine translation (Year: 1989).*

*Primary Examiner* — Xiao S Zhao
*Assistant Examiner* — Joseph S Leyson
(74) *Attorney, Agent, or Firm* — McNees Wallace & Nurick LLC (57) ABSTRACT

A screw-driven extrusion system includes a novel screw-drive extruder. The extruder includes a motor-driven screw. The screw moves solid pellets from a feed hopper into a section that is actively heated. The solid pellets fully liquefy as they pass through the heated section. A control system controls screw, heating, and optionally cooling, operations to selectively control flow of liquefied material from the extruder's tip. The dynamically-controlled can continuously adjust its feed speed and temperature to keep up with continuously changing demands of a larger control system involved in monitoring and running a corresponding 3-D printer in an additive manufacturing process. In contrast to wirefeed extrusion systems that rely on the rigidity of the material in "wire"-formed feedstock, this screw-driven extrusion system is well-suited to use of less-rigid thermoplastic elastomers for the manufacture of objects for use in soft robotics, medical and mold-making applications.

21 Claims, 5 Drawing Sheets

(51) Int. Cl.

| | | |
|---|---|---|
| B29C 48/285 | (2019.01) | |
| B29C 64/386 | (2017.01) | |
| B29C 48/68 | (2019.01) | |
| B29C 48/53 | (2019.01) | |
| B29C 48/395 | (2019.01) | |
| B29C 48/85 | (2019.01) | |
| B29C 48/82 | (2019.01) | |
| G05B 19/18 | (2006.01) | |
| B29C 48/25 | (2019.01) | |
| B29C 64/106 | (2017.01) | |
| B29C 48/80 | (2019.01) | |
| B29C 64/295 | (2017.01) | |
| B29C 64/245 | (2017.01) | |
| B29C 64/329 | (2017.01) | |
| B29C 64/209 | (2017.01) | |
| B29C 64/241 | (2017.01) | |
| B33Y 30/00 | (2015.01) | |
| B33Y 50/02 | (2015.01) | |
| B29K 21/00 | (2006.01) | |

(52) U.S. Cl.
CPC ........ *B29C 48/2526* (2019.02); *B29C 48/288* (2019.02); *B29C 48/397* (2019.02); *B29C 48/53* (2019.02); *B29C 48/6801* (2019.02); *B29C 48/6803* (2019.02); *B29C 48/82* (2019.02); *B29C 48/83* (2019.02); *B29C 48/832* (2019.02); *B29C 48/834* (2019.02); *B29C 48/85* (2019.02); *B29C 48/92* (2019.02); *B29C 64/106* (2017.08); *B29C 64/209* (2017.08); *B29C 64/241* (2017.08); *B29C 64/245* (2017.08); *B29C 64/295* (2017.08); *B29C 64/329* (2017.08); *B29C 64/386* (2017.08); *B29C 48/802* (2019.02); *B29C 2948/926* (2019.02); *B29C 2948/9258* (2019.02); *B29C 2948/92085* (2019.02); *B29C 2948/92104* (2019.02); *B29C 2948/92209* (2019.02); *B29C 2948/92704* (2019.02); *B29K 2021/006* (2013.01); *B33Y 30/00* (2014.12); *B33Y 50/02* (2014.12)

(58) Field of Classification Search
CPC ... B29C 48/397; B29C 48/53; B29C 48/6801; B29C 48/6803; B29C 48/802; B29C 48/82; B29C 48/83; B29C 48/832; B29C 48/834; B29C 48/85; B29C 48/92; B29C 2948/92085; B29C 2948/92104; B29C 2948/92209; B29C 2948/9258; B29C 2948/926; B29C 2948/92704; B29C 64/106; B29C 64/209; B29C 64/227; B29C 64/241; B29C 64/245; B29C 64/295; B29C 64/329; B29C 64/386; B33Y 30/00; B33Y 50/02

See application file for complete search history.

(56) References Cited

U.S. PATENT DOCUMENTS

| | | | |
|---|---|---|---|
| 4,249,877 A * | 2/1981 | Machen | ................ B29C 48/865 425/204 |
| 4,830,219 A | 5/1989 | Siemann | |
| 5,121,329 A | 6/1992 | Crump | |
| 7,891,964 B2 * | 2/2011 | Skubic | ................... B33Y 30/00 425/375 |
| 7,904,196 B2 | 3/2011 | Okazaki | |
| 8,801,415 B2 | 8/2014 | Khoshnevis | |
| 8,815,141 B2 | 8/2014 | Swanson | |
| 8,827,684 B1 | 9/2014 | Schumacher | |
| 2006/0138690 A1 | 6/2006 | Schwaiger | |
| 2006/0157880 A1 | 7/2006 | Hehl | |
| 2008/0315446 A1 | 12/2008 | Muhlenmeister | |
| 2009/0206501 A1 | 8/2009 | Vaneerde | |
| 2011/0241241 A1 | 10/2011 | Matsuda | |
| 2012/0318439 A1 | 12/2012 | Testi | |
| 2014/0017351 A1 | 1/2014 | Annet | |
| 2014/0042657 A1 | 2/2014 | Mulliken | |
| 2014/0134334 A1 | 5/2014 | Pridoehl | |
| 2014/0134335 A1 | 5/2014 | Pridoehl | |
| 2014/0246809 A1 | 9/2014 | Hofmann | |
| 2014/0265040 A1 | 9/2014 | Batchelder | |
| 2014/0316546 A1 | 10/2014 | Walsh | |
| 2015/0321419 A1 * | 11/2015 | Linthicum | ............. B33Y 30/00 264/308 |

FOREIGN PATENT DOCUMENTS

| | | | |
|---|---|---|---|
| CN | 103692653 | 4/2014 | |
| CN | 203543126 | 4/2014 | |
| JP | 01317736 A * | 12/1989 | ............ B29C 48/82 |
| WO | 2014153535 | 9/2014 | |

* cited by examiner

DYNAMICALLY CONTROLLED SCREW-DRIVEN EXTRUSION

CROSS-REFERENCE TO RELATED APPLICATION

This application claims the benefit of priority under 35 U.S.C § 119(e) of U.S. Provisional Patent Application No. 62/102,795, filed Jan. 13, 2015, the entire disclosure of which is hereby incorporated by reference.

FIELD OF THE INVENTION

The present invention relates generally to extrusion systems, and more particularly to a dynamically controlled screw-drive extrusion system that is well-suited to additive manufacturing processes.

BACKGROUND

"Additive manufacturing" is a broad term that generally describes a manufacturing process whereby a three-dimensional model of an object to be fabricated is provided to an apparatus (e.g. a "three-dimensional printer" or a "3-D printer"), which then autonomously fabricates the three-dimensional object by depositing, or otherwise forming, constituent material in the shape of the object to be fabricated until it is fully formed.

There are various additive manufacturing techniques. One exemplary additive manufacturing technique is fused deposition modeling. Such a technique involves use of a fused filament fabrication printer, which is an extrusion-based printer, and is often commonly referred to as a 3-D printer. Such printers generally use a printhead that applies layers of thermoplastic, a metal or metal-containing carrier, or polymers and composites that are doped with a variety of secondary materials such as wood and carbon fiber to create models, prototypes, patterns, and production parts. Such fused filament fabrication works on an "additive" principle by laying down material in layers. This technique was described in U.S. Pat. No. 5,121,329, the entire disclosure of which is hereby incorporated herein by reference.

Exemplary fused filament fabrication printing involves a plastic filament (or metal wire) that is unwound from a coil and supplies material to an extrusion nozzle that can start and stop material flow. The nozzle is heated to melt the material and can be moved in both horizontal and vertical directions by a numerically controlled mechanism which is often directly controlled by a computer-aided manufacturing (CAM) software package. The model or part is produced by extruding small amounts of thermoplastic or other material to form layers as the material hardens immediately after extrusion from the nozzle.

Such 3-D printers typically rely upon a wirefeed system. In a wirefeed system, the filament or wire (hereinafter collectively referred to as "filament") is pushed by a drive motor into a heated nozzle within the print head. The heated nozzle melts the filament material before it is forced through a small diameter die of the print head. The heating of the nozzle is carefully controlled to manage the heating process so that a still-solid upstream portion of the filament material acts like a piston or plunger in a syringe to drive a melted downstream portion of the filament material out of the nozzle before itself melting, in a continuous-feed process. The wirefeed system is thus limited to materials that are sufficiently rigid to be pushed through the nozzle by the drive motor, and to act as a piston/plunger. By way of example, sufficiently rigid plastic materials such as ABS, HDPE, PLA, and PVA are typically suitable for use in such wirefeed systems.

Though such relatively-rigid materials are suitable in many applications, it has been found to be desirable in some applications to manufacture objects of materials that are less-rigid than materials that are sufficiently rigid for use in such wirefeed extrusion systems. By way of example, it may be desirable to use less-rigid materials such as thermoplastic elastomers for the manufacture of objects for use in soft robotics, medical and mold-making applications. Further, while less-rigid plastics or other materials cannot exert enough force on molten plastic below them to extrude in a wirefeed extrusion system, excessively brittle materials may also be unsuitable for such wirefeed extrusion systems. Excessively brittle materials are prone to snap, rather than compress effectively, as threaded through a wirefeed extrusion system.

In laboratory, bench top and industrial applications, large-scale screw-drive extrusion apparatuses are used. Such screw-drive extrusion apparatuses are significantly larger than is feasible for most 3-D printing applications, such apparatuses typically being large in scale (often measured in feet or yards) and sufficiently heavy (often measured in hundreds or thousands of pounds) to be suitable for rapid movement about a print bed of a 3-D printer to build a 3-D printed object. Further, such screw-drive extrusion apparatuses are typically designed to operate according to a single set of operative conditions. For example, they are often tuned to work at a specific temperature, with a specific feed rate, and with a specific extrudate material. This is not useful for a 3-D printer which, ideally, can be used with any plastic the user desires, and at various speeds.

Further, a common form of 3-D printing uses plastics as the extrudate. Unfortunately, plastics don't behave ideally with respect to a screw-drive extrusion process in that the liquid plastic tends to become more fluid as the screw is driven faster to feed move liquid plastic. This means that higher print speeds often require non-proportional increases in extruder speed. Additionally, the energy required to melt the feed material would vary with the extrusion flow rate/feed rate.

Improvements of fused filament fabrication printers requires an increase in printing speed, printing with multiple materials, and lower printer costs.

SUMMARY

The present invention provides a screw-drive extrusion system including a novel screw-drive extruder and a control system for dynamically controlling the screw-drive extruder. The dynamically-controlled extruder can adjust its feed rate, temperature, and optionally cooling, to keep up with continuously changing demands of a larger control system involved in monitoring and running a corresponding 3-D printer.

A motor, such as a stepper motor, drives the screw of the extruder. This screw moves solid plastic pellets from a gravity-fed or other feed hopper, down into a section of the extruder that is actively heated. The heated portion softens the plastic, allowing the pellets to compress together and eliminate air in the plastic melt. The plastic fully liquefies on its way past the nozzle and is fully mixed. The printer's control system commands a certain amount of plastic to be extruded in a given time, and the extruder responds to this command in order for the print to succeed.

In one embodiment, a screw-drive extruder for an additive manufacturing system includes: an upper housing portion defining at a proximal end at least one feedstock port for receiving a flow of feedstock material; a lower housing portion defining at a distal end an extrusion die defining an extrusion opening; the upper and lower housing portions cooperating to define an elongated inner bore having a sidewall; an elongated screw, the screw comprising a shank portion and a drive portion, the drive portion riding within the bore, the at least one flight cooperating with the sidewall to advance feedstock material received via the at least one feedstock port toward the extrusion opening; a bearing assembly joined to the upper housing portion and comprising support bearings for supporting the shank portion of the screw; and a heater positioned about the lower housing portion intermediate the upper portion and the extrusion opening. In one embodiment, a thermal break is provided to provide insulation to thermal conductivity between the lower and upper housing portions. By way of example a thermal insulation flange may be joined to and between the upper and lower housing portions, and may be constructed of a thermally insulative material, and/or may include structure providing an air gap that limits thermal conduction.

Optionally, the extruder may include a first cooling system including a cooling jacket positioned to surround the upper housing portion and to pass a flow of coolant for cooling the upper housing portion and/or a second cooling system. For the second cooling system, the screw defines a central cavity extending longitudinally within the screw, and the screw-drive extruder further includes a thermally conductive member disposed within and extending through the cavity to a free end, and a heatsink supported on the free end. Cooling fins supported on the free end may be cooled by a fan.

A toolhead for an additive manufacturing system including such a screw-drive extruder, a control system for dynamically controlling operation of a toolhead, a screw-drive extrusion system the toolhead and control system, and an additive manufacturing system including the toolhead are provided also.

BRIEF DESCRIPTION OF THE DRAWINGS

The present invention will now be described by way of example with reference to the following drawings in which.

DETAILED DESCRIPTION

The present invention provides a novel screw-drive extrusion system comprising including a novel screw-drive extruder and a control system for dynamically controlling the screw-drive extruder. The control system is designed to continuously adjust the extruder's feed speed and temperature to keep up with continuously changing demands of a larger control system involved in monitoring and operating a corresponding 3-D printer.

Further, the present invention provides an extruder capable of operating upon receipt of a supply of raw plastic feedstock, in contrast to many extruders used in the context of 3-D printers, which operate only upon receipt of a supply of processed filament, which processed filament is itself prepared from a supply of raw plastic feedstock. Accordingly, the raw plastic material as manufactured may be used as the feedstock, and the intermediate step and associated costs of manufacturing processed filament from the raw plastic feedstock may be eliminated.

The novel extrusion system relies upon a novel screw-drive extruder that uses a driven screw to feed plastic material through the extruder. Thus, the system is suitable for use with not only sufficiently rigid plastic materials typically used in wirefeed-based 3-D systems, but also for use with less-rigid materials. For example, the novel screw-drive extruder is well-suited to printing using very soft thermoplastic elastomers, such as a commercially-available CLR15X resin manufactured and/or sold by Elastocon TPE Technologies of Rochester, Ill., or other thermoplastic polyurethane materials.

Figure 1:
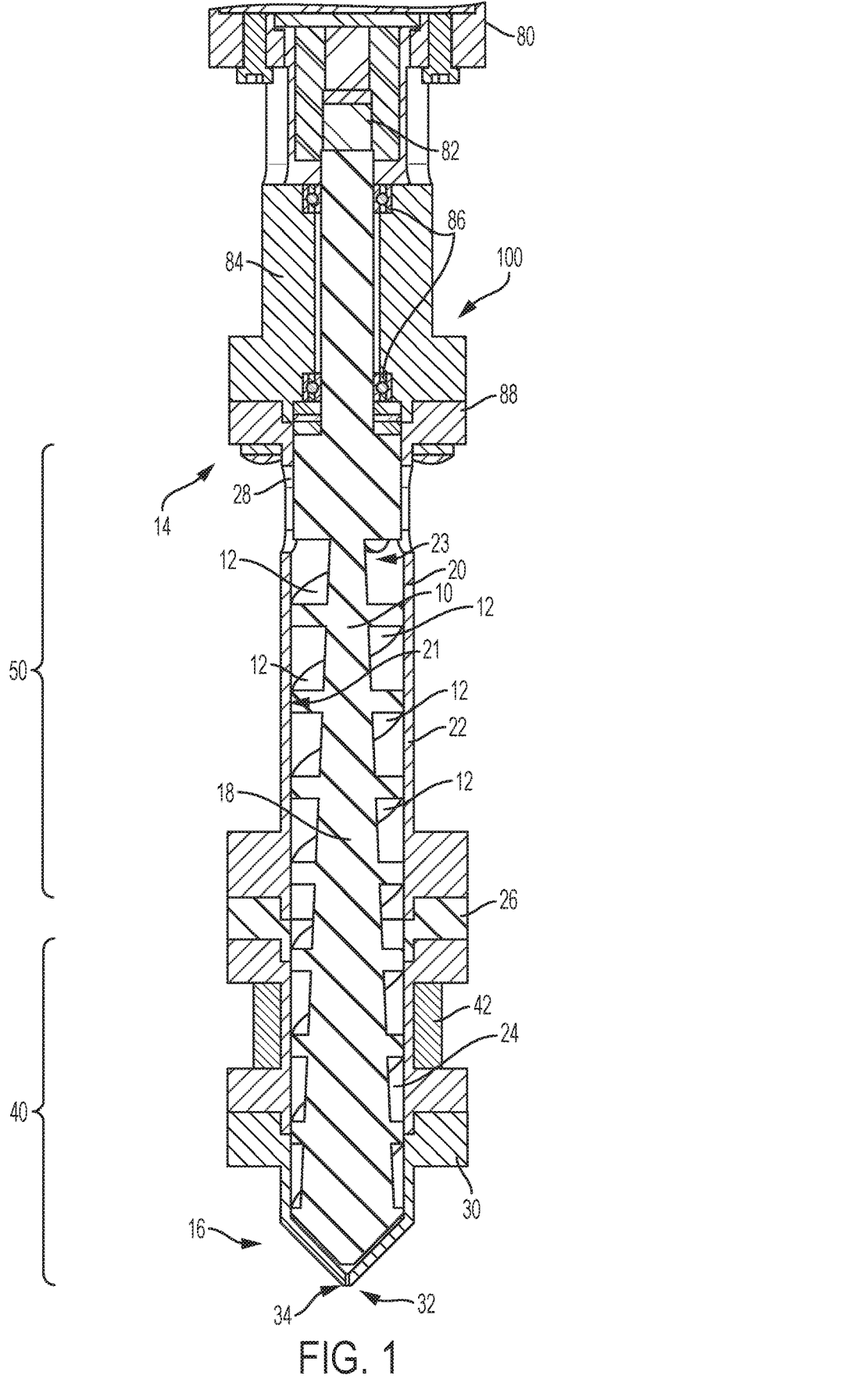
FIG. 1 is a cross-sectional view of an exemplary screw-drive extruder in accordance with an exemplary embodiment of the present invention.

Referring now to FIG. 1, a cross-sectional view of an exemplary screw-drive extruder 100 is shown. Generally speaking, the inventive extruder 100 is somewhat similar in operating principle to many conventional industrial screw-drive extruders, in that it includes a longitudinally extending screw including one or more flights extending in a spiral configuration along the length of the screw, and further in that the screw rides within a bore of an outer housing, such that the screw's flights cooperate with an inner wall of the housing to advance raw materials toward an extrusion die at a distal end of the extruder. However, such conventional industrial screw-drive extruders are large, heavy, high-mass units designed to operate continuously at a single temperature, using a single feedstock material in steady-state operating conditions, and are designed to operated with the screw extending horizontally, all of which tend to make them unsuitable for use in the context of conventional 3-D printers, even with a reduction in scale.

Figure 2:
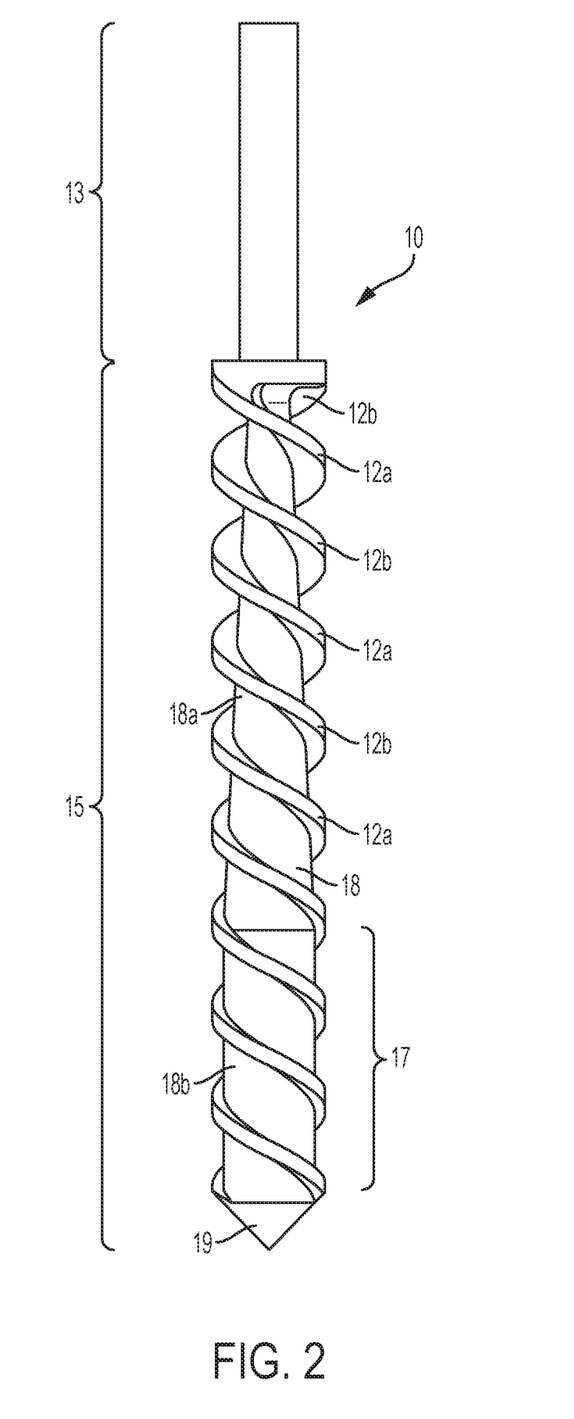
FIG. 2 is a side view of the screw of the extruder of FIG. 1.

Accordingly, the inventive extruder 100 includes a screw 10, as best shown in FIGS. 1 and 2. As shown in FIG. 2, the screw 10 includes a shank portion 13 and a drive portion 15. The drive portion 15 of the screw 10 includes flights 12, and in this exemplary embodiment, twin helical flights 12a, 12b, extending in a spiral configuration along the length of the screw about a central root 18. The root 18 has a surface 18a that tapers radially outwardly from a longitudinal axis AA of the screw. In one embodiment, a distal portion 17 of the root's surface 18b is not tapered, but rather has a consistent cross-section. The screw 10 terminates in a tip 19, which in one embodiment has a conical configuration, as best shown in FIG. 2.

Referring again to FIG. 1, the screw 10 rides within a bore 23 of an outer housing 20, such that the screw's flights 12 cooperate with an inner wall 21 of the housing 20 to advance raw materials supplied at a proximal end 14 of the extruder toward an extrusion die 30 at a distal end 16 of the extruder.

Unlike conventional industrial screw-drive extruders, the novel screw-drive extruder 100 is configured to provide a sharp thermal gradient adjacent the distal end 16 of the extruder, so that feedstock material is melted quickly from a solid state to a liquid state, so that the amount of time spent transitioning the feedstock material from the solid state to the liquid state is limited, since in this transition plastic resin is extremely viscous and tacky, which causes a significantly increased load on the extruder components that may lead to failure, particularly when lightweight (but less rigid) materials are used, and the extruder components are constructed to be small and delicate relative to conventional industrial screw-drive extruders.

To provide this sharp thermal gradient, the exemplary screw-drive extruder 100 includes a housing 20 having a multi-piece design, and the pieces are thermally insulated. In this exemplary embodiment, the housing 20 includes an upper housing portion 22 and a lower housing portion 24, and the upper and lower housing portions 22, 24 are separated by a thermal insulation flange 26 disposed therebetween to prevent direct contact of the upper and lower housing portions, and resulting heat conduction, as best shown in FIG. 1. This exemplary thermal insulation flange 26 is constructed of a material that conducts heat poorly relative to the material used to construct the upper and lower housing portions. By way of example, the bulk of the extruder, including the upper and lower housing portions 22, 24 may be constructed of 6061 aluminum alloy, which is advantageous because of its light weight and strength, but unfortunately in this context conducts heat very well. Accordingly, the thermal insulation flange 26 may be constructed, for example, of polyether ether ketone (PEEK) and may be relatively thin, e.g., about 6 millimeters thick in the direction of elongation of the screw 10.

Alternatively, the thermal insulation flange 26 may be constructed to provide an insulative air gap between the upper and lower portions, to limit thermal conduction therebetween. For example, the extruder may be supported with a small air gap in the barrel assembly (but the actual wall of the extruder is still there—provided by the bronze wear liner) to limit heat flow.

Further, the extruder 100 includes a single, localized heating zone 40 near the distal end 16 of the extruder 100, and more particularly, between the thermal insulation flange 26 and the extrusion die 30. The heating zone 40 includes a heater 42 for heating the lower housing portion 24 and the feedstock contained within the flights 12 within the heating zone 40, such that such feedstock within the zone 40 is heated to its melting point and maintained in the liquid state until it exits via the extrusion die 30.

Thus, the thermal insulation flange 26 seeks to keep the upper part of the extruder (e.g., feed zone 50) cool by separating the heater 42 and extrusion die 30 from the upper feed zone 50, which includes the feed barrel and bearing block assemblies. This has the effect of reducing the amount of power required to achieve a given temperature at the die, as less mass must be heated. Additionally, to reduce the amount of input power required by the heater 42, the outer surface of the heater 42 and extrusion die 30 may be insulated, e.g., by a covering 60 of ceramic wool insulative material, as in the exemplary embodiment of the toolhead 150 shown in FIG. 3.

Figure 3:
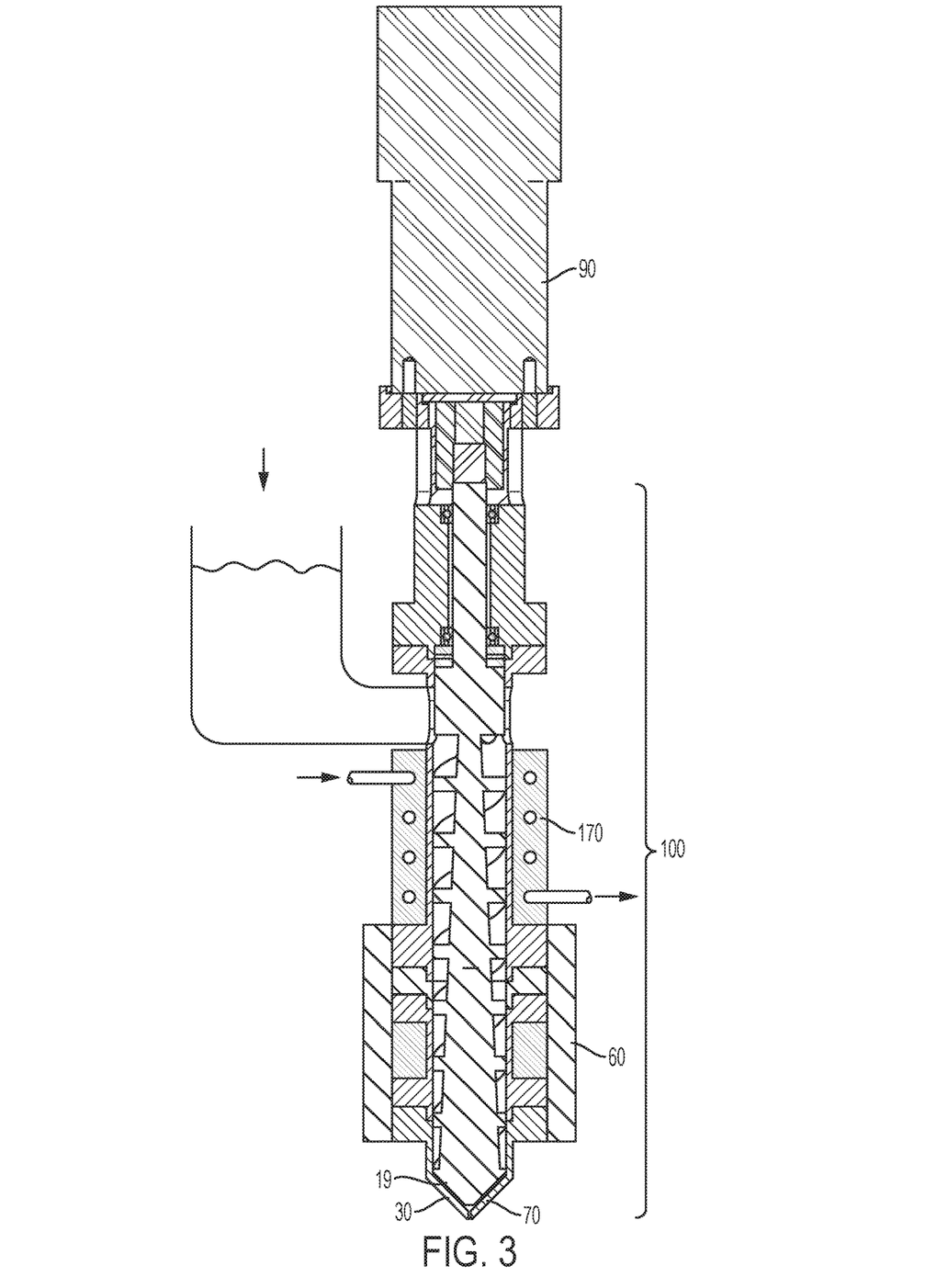
FIG. 3 is a cross-sectional view of an exemplary tool head in accordance with an exemplary embodiment of the present invention, including an exemplary screw-drive extruder similar to that of FIG. 1, and a primary cooling system.

In this exemplary embodiment, the screw 10 is constructed to be slightly but significantly shorter than the bore to provide a small region 70 between the distal tip 19 of the screw 10 and the inner wall of the extrusion die 30/housing 20, that is not swept by the screw, as best shown in FIGS. 2 and 3. This small region 70 serves as a reservoir of plastic to be printed, which allows the extruder to deal with rapid changes in extrusion rate.

The extruder is designed to be mounted in a vertically-extending orientation to meet the needs of common 3-D printer designs. An electric motor 90, such as a stepper motor, may be used to drive the screw. Thus, a toolhead 150 for a 3-D printer includes the extruder 100, and a motor 90 for driving the screw 10 of the extruder 100, as shown in FIGS. 1 and 2. The extruder 100 thus further includes a motor mounting flange 80, a motor shaft coupler 82, and a bearing assembly 84 for supporting an upper portion of the screw 10, as best shown in FIG. 1. In an exemplary embodiment, the motor 90 drives the extruder through a 51:1 planetary reduction gear, and this torque is transmitted to the screw via the motor shaft coupler 82. The shank portion 13 of the screw 10 couples directly to the motor shaft coupler 82, and then passes through the bearing assembly 84, which supports and constrains the screw as it compresses the feedstock.

In this example, the bearing assembly 84 includes main support bearings 86, such as standard ball bearings, to absorb loads in the radial direction while allowing the screw 10 to spin smoothly, even when compressing unevenly sized feedstock pellets. Further, the bearing assembly 84 includes a main thrust bearing 88 that absorbs the large vertical loads created by compressing the feedstock and transmitting these loads to the bearing assembly 84 and the housing 20 of the extruder. The bearing assembly 84 is rigidly attached, e.g., bolted, to the housing 20. In an exemplary embodiment, the external components of the extruder (bearing assembly block, feed barrel housing, thermal insulation flange, barrel heater, and nozzle) use a common flange design with a tongue-and-groove circular interlock to provide sealing and alignment at high temperatures. They also all share a common bolt pattern to enable easy assembly. This helps maintain mechanical alignment of the two components.

Thus, the shank portion 13 of the screw 10 is coupled to the motor 90, which should remain relatively cool. Accordingly, for example, the screw 10 may be constructed of 316-series stainless steel, which is advantageous because of its comparatively low thermal expansion and thermal conductivity characteristics.

Thus, the inventive screw-drive extruder provides a sharp thermal gradient along its length. The temperature from the infeed openings 28 at the proximal end 14 of the housing to the thermal insulation flange 26 is preferably held nearly constant, and preferably close to room temperature. In contrast, the temperature between the thermal insulation flange 26 and the extrusion die is preferably held near the melting point of the resin, often in excess of 250 degrees Celsius, depending upon the material used as feedstock.

Figure 4:
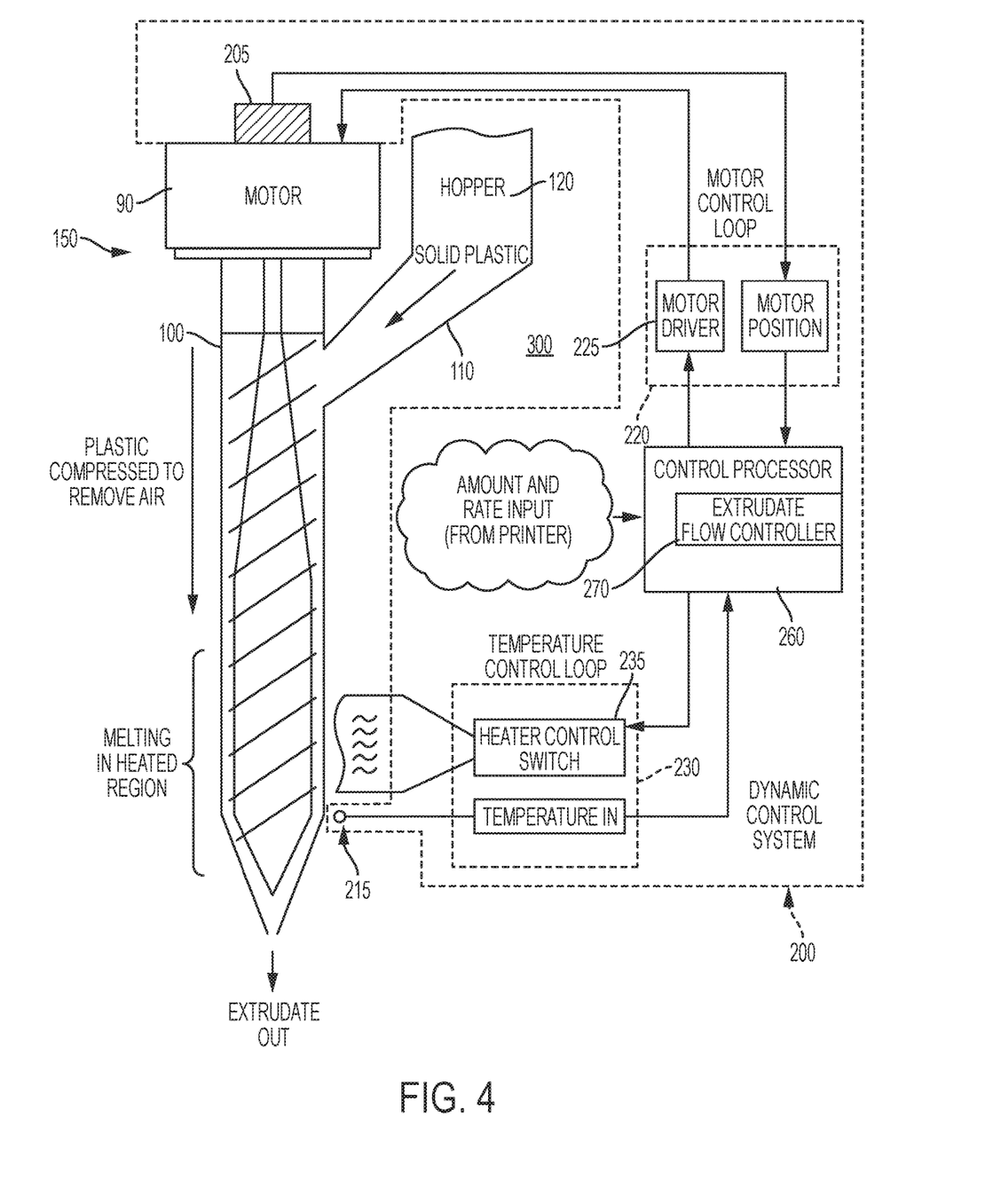
FIG. 4 is a diagrammatic view of a screw-drive extrusion system, including the screw-drive extruder of FIG. 1 and a novel dynamic control system, in accordance with an exemplary embodiment of the present invention.

The upper portion 22 of the housing 20 includes at the proximal end 14 at least one opening, and preferably a plurality of openings, providing feedstock ports 28. These feedstock ports 28 mate with a supply conduit 110 carrying feedstock (e.g., solid plastic resin pellets) from a hopper 120, as best shown in FIG. 2. In one exemplary embodiment, the hopper 120 and conduit 110 are supported on and carried by the toolhead 150, as shown in FIGS. 3 and 4. Feedstock pellets enter the extruder housing 20 through the feedstock ports 28. In one embodiment, there are six ports with equal radial spacing about the housing, around the screw 10. The feedstock is then a compressed by the screw 10, as the screw is driven by the motor 90. As discussed above, the screw 10 has helical flights 12 that apply downward pressure to the feedstock as the screw rotates within the housing. The tapered root 18 of the screw provides mechanical strength for the screw 10, and applies radial pressure to as the feedstock as it is forced past it by the flight 12. This allows the large, solid pellets of resin in the upper feed section 50 of the extruder 100 to flow into the system easily, and compresses them uniformly as they travel toward the extrusion die 30.

Accordingly, the screw 10 applies mechanical pressure to the feedstock, removing air and, in concert with the heater 42, liquefies the feedstock, as the screw is driven by the motor. By way of example, the heater 42 may be provided electrically resistive coils extending around the housing 20 within a defined heating zone 40 extending for a minor portion, e.g., less than 20 percent, of the length of the screw, and between the thermal insulation flange 26 and the extrusion die 30. Current for powering the heater 42 is provided by a control system, as discussed in greater detail below.

As the solid feedstock is pumped down through the extruder, it gradually softens with increasing temperature. As this softening occurs, air is forced out from between individual feedstock pellets and escapes back up and out of the feedstock ports 28 at the top of the extruder. The now-uniform mass of feedstock is further compressed by the root of the screw, which tapers outwardly toward the internal walls of the housing 20, while the heater 42 raises the temperature of the feedstock until it fully liquefies. In one embodiment, this occurs about 3 centimeters above an end face 32 of the extrusion die 30. As noted above, it is desirable to limit the amount of time the resin spends transitioning from solid to liquid, as plastic resin in this state is extremely viscous and very tacky—it adheres to the walls of the extruder, and to the root and sides of the flights on the screw, vastly increasing forces necessary to extrude.

Continuing down the extruder, the feedstock passes the heater 42 and is fully liquefied and brought to operational temperature, which varies throughout the print according to the demands of the printer, as will be described in more detail below along with the control system. Pressure from the screw and from descending resin above then forces the liquid feedstock down into the nozzle assembly, where the screw tapers sharply to follow the inside contour of the nozzle and provide consistent pressure to the resin melt as it enters the die. In one embodiment, the inside contour is generally conical in shape.

The extrusion die 30 defines a small extrusion opening 32 located at the distal end of the nozzle. In the die, the high pressures in the extruder force the resin out through a small opening, e.g., an opening 0.35 millimeters in diameter. After the melt exits the die (now called extrudate), it cools rapidly to solid form and takes its final diameter—depending on the linear speed of the 3-D printer, which is commonly between 10 and 300 millimeters per second. The vertical separation between the die face 34 and the item being printed is controlled to be less than the final diameter of the extrudate so that the extrudate is compressed between the die face and the printed part. Its heat causes it to fuse permanently to the polymer below it, creating strong printed parts. Notably, this is a continuous process in that raw plastic may be continuously fed into the system and compressed.

FIG. 4 is a diagrammatic view of a screw-drive extrusion system 300 that includes the screw-drive extruder 100 of FIG. 1 and a novel dynamic control system 200 in accordance with an exemplary embodiment of the present invention.

The extruder has a number of electrical components that require active control or monitoring, in addition to communication with the control system of the 3-D printer to which it is attached. The monitoring and controlling of the toolhead 150 is performed by the dynamic control system 200. The dynamic control system includes a plurality of sensors for monitoring system conditions, and a plurality of controllers for controlling system conditions, and a control processor 260 for receiving data from the sensors, and for actuating the controllers.

For example, the motor 90 is driven and monitored. Accordingly, the control system 200 includes a motor speed sensor 205, such as an encoder for monitoring motor drive shaft position over time, and sending corresponding motor position data signals to the control processor 260. Such speed sensors/encoders are well-known in the art and commercially available, and are beyond the scope of the present invention. Any suitable motor speed sensor may be used. The control processor 260 includes a microprocessor, a memory, an I/O data acquisition connector, as well as firmware and instructions stored in the memory and executable by the microprocessor to provide a motor control loop 220. The motor control loop, under control of the microprocessor, sends a corrective signal to the motor 90 under control of a motor driver component 225. In this manner, a closed motor control loop is provided to ensure that the motor is operating as desired, e.g., at an appropriate speed. The appropriate speed is further determined and controlled by the control processor 260 as described in greater detail below.

By way of further example, the heater 42 is controlled so that is supplied with the correct amount of current to achieve the desired temperature. Accordingly, the control system 200 includes a temperature sensor 215, such as a thermocouple for monitoring temperature over time, and sending corresponding temperature data signals to the control processor 260. Such temperature sensors/thermocouples are well-known in the art and commercially available, and are beyond the scope of the present invention. Any suitable temperature sensor may be used. The control processor includes instructions stored in the memory and executable by the microprocessor to provide a heater control loop 230. The heater control loop, under control of the microprocessor, sends a corrective signal to the heater 42 under control of a heater control switch 235. By way of example, the heater control switch 235 may be a power switch. By way of example the heater control switch 235 may be an N-channel MOSFET switch of suitable power rating, e.g., 7.5 A at 24V in an exemplary embodiment. The heater control loop repeatedly compared the current temperature to a setpoint. Current temperature is measured via the thermocouple, which produces a signal that is amplified then digitized, allowing the control processor 260 to monitor and update the temperature setpoint as necessary. In this manner, a closed heater control loop is provided to ensure that the heater is operating as desired, e.g., at an appropriate temperature. The appropriate temperature is further determined and controlled by the control processor 260 as described in greater detail below.

In certain embodiments, the feed resin supply may be monitored and controlled, e.g., by monitoring a level of pellets in the hopper, and causing refill of the hopper when the supply reaches a predetermined level.

The control system 200, and more specifically, the control processor 260, receives input from the 3-D printer's control system (not shown). Such control systems of 3-D printers are well-known in the art, and are beyond the scope of the present invention. A conventional 3-D printer's control system includes a main controller that has onboard the ability to control the printer's motor and heater. In a conventional wirefeed system, the motor is controlled to push into the heater a commanded length of wire having a known diameter. The main controller in a conventional 3-D printer provides its instructions digitally, using a "g-code" file, that provides the corresponding instructions.

The present invention uses the information from a conventional 3-D printer's control system in an unconventional manner. Specifically, the inventive system is configured to receive "g-code" information from a conventional 3-D printer's control system and to exploit known relationships. Because the conventional control system provides filament length instructions and extrusion rate instructions for the wirefeed extrusion system, and because the conventional printer's motor speed and filament diameter are known for the printing system, the inventive control system determines an appropriate volume flow rate and extrusion volume for the screw-drive extrusion system corresponding to the conventional printer's instruction. This is performed by an extrudate flow controller 270 of the control processor 260.

Accordingly, the information gathered from a conventional 3-D printer's control system effectively provides an extrusion rate command, and an amount to be extruded. From this input, the control processor 260 determines the appropriate motor speed set point and the appropriate temperature set point for providing the required extrudate flow, and instructs the motor control loop 220 and heater control loop 230 accordingly.

More specifically, from the received control signal, the control processor 260 determines the amount of time to extrude as well as the melt temperature necessary and the motor speed required. Melt temperature cannot be set arbitrarily—the printer will have some demands as to the temperature of the melt in order to achieve as strong a bond between layers of the extrudate as possible. As a result, for a given extrusion rate, the control processor 260 must carefully choose its temperatures in order to allow the motor to turn the screw at the required rate. If the temperature is too cool, the motor cannot supply enough torque to turn the screw, and the melt will not adhere to previous layers. If the temperature is too hot, the system may overheat. Further, resin passing through the system acts as a coolant in that, as it melts, it absorbs heat and holds a constant temperature, before further heating after melting down through the heater. This absorbs yet more heat, before the resin leaves the nozzle, taking all of that heat with it. This means the heater must supply more heat to compensate. If the melt gets too hot, however, it may become too thin, meaning that it leaks from the nozzle at an uncontrolled rate, leaving strings and blobs on the model which reduce quality and increase material usage. This is not an issue for conventional large scale extruders that operate at a single speed—these conventional systems simply optimize the heat level to compensate for the constant heat loss through the melt. Unfortunately, operating an extruder atop a 3-D printer means that the mass flow rate of resin is constantly changing—constantly changing the heat loss due to the melt, meaning that to maintain a consistent temperature of the melt through the nozzle, the power supplied to the heater must also constantly change. This power level is set by modulating the current supplied to the resistive heater wrapped around the barrel.

The control processor 260 determines the appropriate motor speed and the appropriate temperature (for each feedstock material) as a function of the desired extrusion rate and extrusion amount by referencing a calibration curve stored in the memory of the control processor 260. The calibration curve is generated and stored for each type of feedstock compatible with the 3-D printer. This curve is generated by extruding feedstock at a known temperature and known motor speed for a given time and measuring the actual mass of resin extruded. This is performed across the extruder's temperature and speed range, creating an envelope of known points inside which the control system can calculate its operational parameters based on input from the printer. The calibration curve also specifies motor speeds necessary to achieve a given mass output. As described above, the motor 90, e.g. stepper motor, drives a reduction gearbox, which is coupled to the screw 10. This motor 90 is driven from a power driver 225 on the control board at a rate commanded by the system. Accordingly, for example, the calibration curve may provide that for a certain material, a temperature of 195 degrees C. and motor speed of 5.5 RPM provides a mass flow rate of 12 g/s. From the curve information, if the extruder receives a code requiring extrusion of 10 mm of 1.75 mm filament at 226 mm/minute, the control system determines a required volume and/or motor speed from that command information, and provides corresponding control signals to control the extruder, via the motor control loop and the heater control loop.

In certain embodiments, the motor control loop further controls the motor, under control by the control processor 260, to cause motor movement intended to induce vibration of the extruder 100, rather than simply to drive the screw for the purpose of extrusion. Such vibrations are caused to promote mobility of the feedstock with the conduit 110 and/or the extruder 100. Such vibrations are useful in that the extruder tends to be mounted vertically for 3-D printer applications, and the feedstock is fed through the ports 28 generally horizontally, in which case a gravity-fed arrangement alone has been found to sometimes be insufficient for adequate feedstock flow.

As noted above, the arrangement described herein provides for a compact and lightweight extruder and toolhead suitable for use in a 3-D printer. Typical commercially-available industrial screw-drive extruders have screw length-to-diameter ratios between roughly 20:1 and 40:1, meaning that the screw length is 20 times the outside diameter of the screw. These long sections allow the resin to melt and mix thoroughly, providing a more homogeneous output than could be obtained with a shorter screw. Material strength places a hard limit on the minimum outside diameter of the screw—industrial extruders can have screw diameters as large as 12 inches, but commercially-available lab extruders have been found having diameters as small as 0.75 inch to 1 inch. This is a result of drive torque—thinner screws would simply shear under the loads applied to them, as not enough material is present to bear the stress.

An exemplary extruder in accordance with the present invention has a 0.625 inch outside diameter and a length of just 4.75 inches, resulting in an length to diameter ratio of just 7.6:1. For a 6" diameter commercial screw, typically-sized feedstock pellets act something like a fluid—individual resin pellets are small relative to the infeed zone, and move freely. As the diameter gets smaller, the screw must pump something that behaves more like gravel than a fluid—particles jam against one another, and are often much wider than the screw flights themselves. This dictates a deep feed section on the screw, which tapers outward from the feed section to the melting and metering zone. To accommodate the comparatively large feedstock pellets, the screw must have an aggressive taper in the region where the pellets are still solid. This weakens the screw, as the core, which bears the brunt of the mechanical stress applied to the screw, is extremely thin—in our design, less than 0.25 inches—in a region where the most stress is applied (the sum of all the torque applied by the polymer down the length of the screw passes through the core near the feed section, where it is at its thinnest). To address this, in certain embodiments, the upper feed section flights of the screw may be thicker, and taper into the core to provide as much strength to the screw as possible in the upper feed section. Further, it may be advantageous to keep this upper feed section of the screw close to the support bearings, e.g., such that the main thrust bearing is located directly above the feed section, less than 0.25 inches from the thinnest part of the core, and the first main radial bearing may be provided directly above that. This provides significant support to the screw, reduces radial deflection from the resin pellets, and protects the core of the screw from repeated stress failure.

In further contrast, conventional instructions screw-drive extruders operate continuously, at one set rate. This means that they experience steady-state operating conditions. The pressure inside the polymer channels is relatively constant, and increases down the screw toward the die face. This is a conscious design choice for these extruders, as it is much simpler to optimize for a specific operational point than for many. In contrast, the exemplary system is dynamic in nature—the 3-D printer will often request different flow rates from the extruder, and will also often request that the extruder cease extruding abruptly to allow the toolhead to move to a different feature being built up. This means that the pressure in the extruder is not constant—the momentum of the molten resin causes the polymer to continue to extrude even after the screw stops. Additionally, the heater cannot heat up and cool down instantaneously, so it is common for more polymer than necessary to be melted when the screw is stopped. This molten polymer expands relative to solid polymer resin, and thus tends to force itself out the nozzle, which is not desirable for a 3-D printer, as it can create blobs and strings that stick to the part being printed, and can cause undesired outcomes including poor surface finish, outright print failure, and mechanical damage to the printer. To mitigate this effect, the control system causes the heater to adapt rapidly to the flow rate of material through the nozzle.

Additionally, in one embodiment, a cooling system is provided by which the barrel assembly, particularly in the feed zone 50, is actively cooled by a flow of coolant circulated through a jacket 170 abutting and surrounding the housing within the feed zone 50. This arrangement provides a heat exchanger capable of cooling the extruder 100, thus limiting melting above a thermal break near the heater 42, as best shown in FIGS. 1 and 3. The coolant, such as water, may be circulated steadily and/or continuously by an external pump (not shown), or alternatively, may be controlled by the dynamic control system 200 to vary the pumping rate and vary the cooling effect. Additionally, the very small (0.02") opening in the extrusion die 30 is advantageously kept short, to limit friction from the material passing through the narrow zone. The size of the die orifice is the cause of the majority of the extruder backpressure, but this can be mitigated by limiting the amount of time the polymer spends in this narrow cross section.

Further, conventional industrial screw-drive extruders typically have multiple heating zones, running the length of the machine, providing flexible and robust temperature control. In sharp contrast, the system described herein has one heated zone, located immediately above the extrusion die face, providing a sharp thermal transition, with the aim that the polymer should transition very quickly from solid to liquid. The "gum-like" phase between solid and liquid is incredibly sticky, and causes massively increased friction against the screw and walls, increasing required drive torque. Additionally, since the extruder is so small, pumping lots of heat into the extruder tends to heat other extruder components, such as the motor, which is undesirable. To minimize this, the heater is controlled dynamically, and can apply a continuously changing amount of heat as requested by the control system.

The effect of these differences is to create a system that adapts quickly to changing flow rate demands, which is accomplished through a dynamically controlled variable heater to limit unwanted melting when polymer is not flowing, and to maximize flow rates at high print speeds.

Commercial extruders typically require post-processing in order to provide a finished product—pelletizing extruders (like those used to manufacture the feedstock for our extruder) require chopping and tumbling equipment to finish the pellets. Injection molding machines use a mold to provide the final shape of the product, while the extruder provides simply a flow of pressurized molten polymer. In contrast, the system described herein provides smooth, consistent output directly from the nozzle—the part being printed is often less than 0.01" below the nozzle, meaning that the extrudate has very little time to normalize, and no finishing is possible. Thus, the goal of the extruder is to produce perfect filament for the printing process at all times. To do this, the die orifice is kept very short. In one embodiment, the end of the die opening is chamfered back to allow the polymer to expand slightly as the pressure drops to ambient, and the face of the die is polished smooth to impart the highest quality surface finish to the molten polymer before it hardens.

Figure 5:
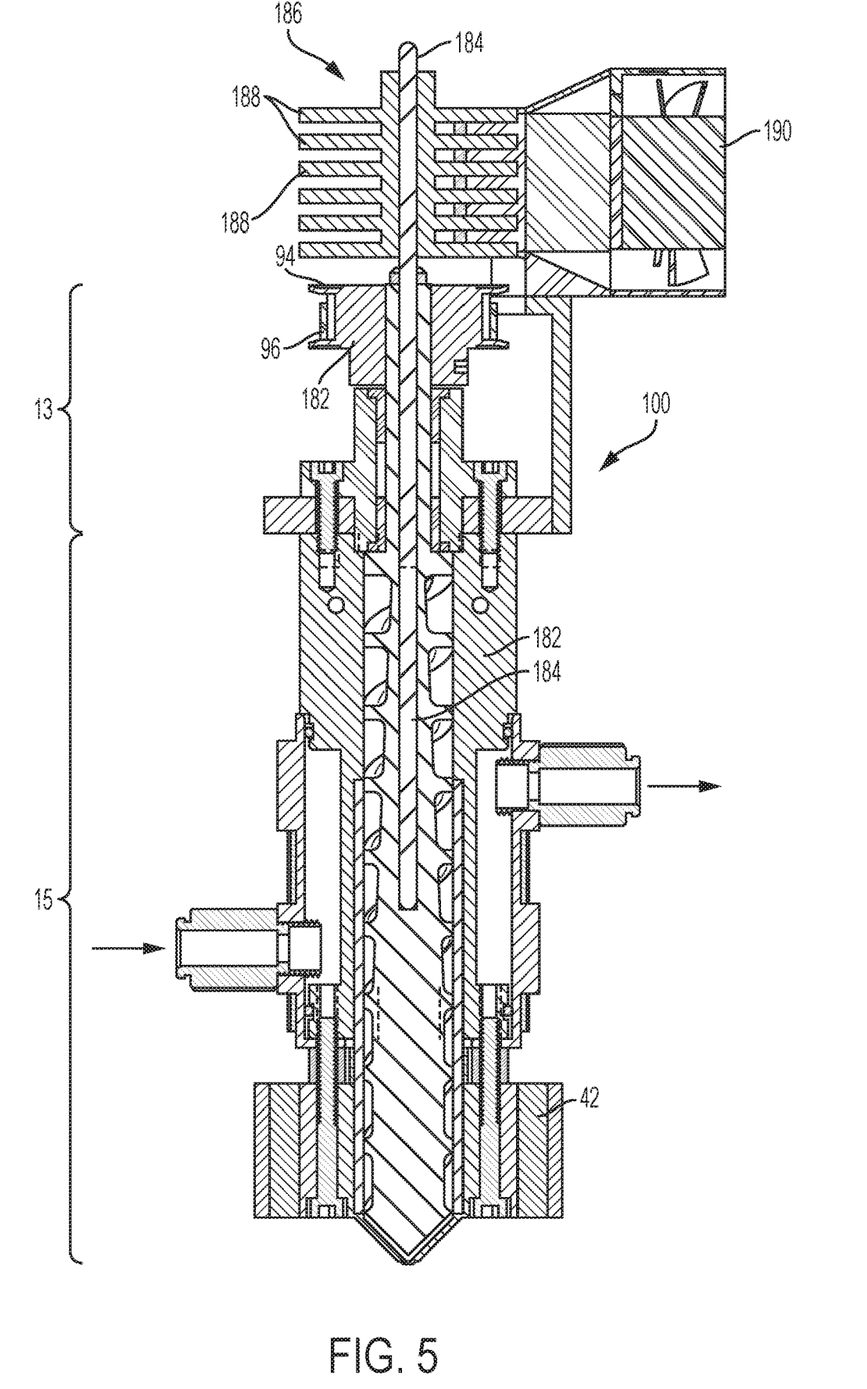
FIG. 5 is a cross-sectional view of another exemplary tool head in accordance with another exemplary embodiment of the present invention, including an exemplary screw-drive extruder similar to that of FIG. 3, and further including a secondary cooling system.

FIG. 5 is a cross-sectional view of another exemplary tool head in accordance with another exemplary embodiment of the present invention. This embodiment includes an exemplary screw-drive extruder similar to that of FIG. 3, which includes a primary cooling system including a jacket 170 and pump for circulating coolant to cool the toolhead adjacent (above) the heated region, to limit conduction of heat from the heated region to an extent that is not detrimental to transport of pellets, as described above. In this alternative exemplary embodiment, the exemplary toolhead further includes a secondary cooling system 300. As shown in FIG. 5, in this exemplary embodiment, the screw 10 is modified to have a central cavity 182, e.g., bore, for receiving a thermally conductive member, e.g., a heat pipe. The central cavity may be a bore, and preferably extends continuously through the shank portion 13 and drive portion 15 of the screw 10. The cavity 182 preferably extends into the region in which the screw 10 is surrounded by the cooling jacket 170, but preferably does not extend into the heated region adjacent (beneath) the cooling jacket 170.

The thermally conductive member 184 may have the form of a rod, and optionally is a heatpipe. The heatpipe is constructed to provide thermally conductive material having a thermal conductivity higher than that of the screw. By way of example, a water-filled copper heatpipe is suitable for this purpose. Such heat pipes are well known in the art, and commercially available, and are beyond the scope of the current invention. Any suitable heat pipe may be used, and by way of example, can provide 2-3 orders of magnitude more conductivity than a stainless steel screw.

In this embodiment, a motor shaft coupler 94 is fixed to the screw for transmitting power from a driven motor to the screw 10. By way of example, the motor shaft coupler 94 may be a pulley or gear. A drive system includes a motor (not shown) that during operation drives a belt or chain or gear 96 that engages motor shaft coupler 94 and causes the screw to rotate about its longitudinal axis. Accordingly, in this embodiment, the cavity 182 extends through the motor shaft coupler 94. The thermally conductive member 184 extends through the cavity of the motor shaft coupler 94 and beyond to provide a free end 186. The free end 186 preferably supports a heatsink, such as an array of radially extending fins 188. Accordingly, heat from the portion of screw 10 adjacent the heated region will be conducted to the heatsink/fins 188. The secondary cooling system 300 further includes an electrically-powered cooling fan 190, and optionally further includes a cowling 192 supported between the fan 190 and thermally conductive member 184 to direct a flow of cooling air from the fan over the heatsink/fins 188 and thermally conductive member 184, as shown in FIG. 5. The fan 190 may be caused to run steadily and/or continuously by supplying continuous electrical power, or alternatively, may be controlled by the dynamic control system 200 to selectively enable the fan's operation and/or moderate the fan speed to vary the cooling effect.

Also provided in accordance with the present invention is a 3-D printer comprising a screw-drive extrusion system, including the screw-drive extruder and control system for dynamically controlling the screw-drive extruder, described herein.

While there have been described herein the principles of the invention, it is to be understood by those skilled in the art that this description is made only by way of example and not as a limitation to the scope of the invention, and that various changes in detail may be effected therein without departing from the spirit and scope of the invention as defined by the claims.

What is claimed is:

1. A screw-drive extrusion system comprising:
    a toolhead, the toolhead comprising:
        a screw-drive extruder, the screw-drive extruder comprising
            an upper housing portion defining at a proximal end at least one feedstock port for receiving a flow of feedstock material;
            a lower housing portion defining at a distal end an extrusion die defining an extrusion opening, said lower housing portion cooperating with said upper housing portion to define an elongated inner bore having a sidewall;
            an elongated screw having at least one flight, said screw comprising a shank portion and a drive portion, said drive portion riding within said elongated inner bore, said at least one flight cooperating with said sidewall to advance feedstock material received via said at least one feedstock port toward said extrusion opening;
            a bearing assembly joined to said upper housing portion and comprising support bearings for supporting said shank portion of said screw; and
            a heater positioned about said lower housing portion intermediate said upper housing portion and said extrusion opening;
        a motor, said motor comprising a drive shaft coupled to the elongated screw;
        a hopper for receiving feedstock pellets, and
        a conduit extending from a lower end of said hopper to the at least one feedstock port of said screw-drive extruder, said conduit being adapted for conveying feedstock pellets from said hopper to said screw-drive extruder;
    and
    a control system for dynamically controlling operation of the toolhead, said control system comprising:
        a motor speed sensor configured to monitor motor drive shaft position over time and send corresponding motor position data signals to a control processor;
        a motor driver configured to send a motor control signal to the motor;
        a temperature sensor configured to monitor temperature over time and send corresponding temperature data signals to the control processor;
        a heater controller configured to send a temperature control signal to the heater;
        said control processor comprising a microprocessor, a memory, an input/output data acquisition connector, firmware, and instructions stored in the memory and executable by the microprocessor to provide a motor control loop and a temperature control loop,
        said motor control loop comprising instructions stored in said memory and executable by said microprocessor to send a first control signal to said motor driver to cause said motor to operate in accordance with a speed set point;
        said temperature control loop comprising instructions stored in said memory and executable by said microprocessor to send a second control signal to said heater controller to cause said heater to operate in accordance with a temperature set point; and
        an extrudate flow controller comprising instructions stored in said memory and executable by said microprocessor to determine, repeatedly over time, a current temperature set point and a current speed set point,
        the extrudate flow controller further comprising instructions stored in said memory and executable by said microprocessor to receive, from an external control system, a command for filament length and motor speed for a wirefeed extrusion system, and for determining said current temperature set point and said current speed set point as a function of said filament length and motor speed instructions, said current temperature set point and said current speed set point being determined by calculating a desired volumetric flow rate as a function of said filament length and motor speed instructions and by referencing calibration data stored in said memory to determine said set points.

2. The screw-drive extrusion system of claim 1, the screw-drive extruder further comprising:
    a thermal insulation flange, said thermal insulation flange being joined to and between said upper and lower housing portions and cooperating therewith to define said inner bore, said thermal insulation flange providing insulation to thermal conductivity between said lower and upper housing portions.

3. The screw-drive extrusion system of claim 1, the screw-drive extruder further comprising:
    a motor shaft coupler joined to the shank portion of said screw; and
    a motor mounting flange for mounting the motor in a position with its drive shaft coupled to said motor shaft coupler.

4. The screw-drive extrusion system of claim 1, the screw-drive extruder further comprising:
    a motor shaft coupler joined to the shank portion of said screw, wherein the motor shaft coupler comprises one of a pulley and a gear.

5. The screw-drive extrusion system of claim 1, wherein a root of the screw has a surface that tapers radially outwardly from a longitudinal axis of the screw.

6. The screw-drive extrusion system of claim 1, wherein a root of the screw has a distal surface portion that is not tapered, but rather has a consistent cross-section.

7. The screw-drive extrusion system of claim 1, wherein the screw has a tip and wherein said tip has a conical configuration.

8. The screw-drive extrusion system of claim 1, wherein said screw is constructed to be slightly but significantly shorter than the bore to provide a small region between a distal tip of the screw and the opening in the extrusion die that is not swept by the screw.

9. The screw-drive extrusion system of claim 1, further comprising a covering of insulative material, said covering being positioned to surround at least a portion of the lower housing portion of the screw drive extruder.

10. The screw-drive extrusion system of claim 1, further comprising a cooling jacket, said cooling jacket being positioned to surround said upper housing portion of the screw drive extruder and to pass a flow of coolant for cooling the upper housing portion.

11. The screw-drive extrusion system of claim 10, wherein said screw defines a central cavity extending longitudinally within said screw, said screw-drive extruder further comprising:
    a thermally conductive member disposed within and extending through said cavity to a free end;
    a heatsink supported on said free end.

12. The screw-drive extrusion system of claim 11, wherein said thermally conductive member comprises a heat pipe having a thermal conductivity greater than a corresponding thermal conductivity of a material of said screw.

13. The screw-drive extrusion system of claim 11, wherein said heatsink comprises an array of cooling fins extending radially from said thermally conductive member.

14. The screw-drive extrusion system of claim 13, further comprising a cooling fan disposed to direct a flow of air over said heatsink.

15. The screw-drive extrusion system of claim 1, wherein said screw defines a central cavity extending longitudinally within said screw, said screw-drive extruder further comprising:
    a thermally conductive member disposed within and extending through said cavity to a free end; and
    a heatsink supported on said free end.

16. The screw-drive extrusion system of claim 15, wherein said thermally conductive member comprises a heat pipe having a thermal conductivity greater than a corresponding thermal conductivity of a material of said screw.

17. The screw-drive extrusion system of claim 15, wherein said heatsink comprises an array of cooling fins extending radially from said thermally conductive member.

18. The screw-drive extrusion system of claim 17, further comprising a cooling fan disposed to direct a flow of air over said heatsink.

19. The screw-drive extrusion system of claim 1, further comprising:
    a planetary reduction gear coupling said drive shaft of said motor to a motor shaft coupler.

20. An additive manufacturing system comprising:
    a build platform; and
    a screw-drive extrusion system according to claim 1; and
    a main control system for controlling relative movement of the toolhead and the build platform with at least three degrees of freedom, the main control system providing at least one command for supply of extrudate.

21. A screw-drive extrusion system comprising:
    a toolhead, the toolhead comprising:
        a screw-drive extruder, the screw-drive extruder comprising
            an upper housing portion defining at a proximal end at least one feedstock port for receiving a flow of feedstock material;
            a lower housing portion defining at a distal end an extrusion die defining an extrusion opening, said lower housing portion cooperating with said upper housing portion to define an elongated inner bore having a sidewall;
            an elongated screw having at least one flight, said screw comprising a shank portion and a drive portion, said drive portion riding within said elongated inner bore, said at least one flight cooperating with said sidewall to advance feedstock material received via said at least one feedstock port toward said extrusion opening;
            a bearing assembly joined to said upper housing portion and comprising support bearings for supporting said shank portion of said screw; and
            a heater positioned about said lower housing portion intermediate said upper housing portion and said extrusion opening;
        a motor, said motor comprising a drive shaft;
        a hopper for receiving feedstock pellets, and
        a conduit extending from a lower end of said hopper to the at least one feedstock port of said screw-drive extruder, said conduit being adapted for conveying feedstock pellets from said hopper to said screw-drive extruder;
    and
    a control system for dynamically controlling operation of the toolhead, said control system comprising:
        a motor speed sensor configured to monitor motor drive shaft position over time and send corresponding motor position data signals to a control processor;
        a motor driver configured to send a motor control signal to the motor;
        a temperature sensor configured to monitor temperature over time and send corresponding temperature data signals to the control processor;
        a heater control switch configured to send a temperature control signal to the heater;
        said control processor comprising a microprocessor, a memory, an input/output data acquisition connector, firmware, and instructions stored in the memory and executable by the microprocessor to provide a motor control loop and a temperature control loop,
        said motor control loop comprising instructions stored in said memory and executable by said microprocessor to send a first control signal to said motor driver to cause said motor to operate in accordance with a speed set point;
        said temperature control loop comprising instructions stored in said memory and executable by said microprocessor to send a second control signal to said heater control switch to cause said heater to operate in accordance with a temperature set point; and
        an extrudate flow controller comprising instructions stored in said memory and executable by said microprocessor to determine, repeatedly over time, a current temperature set point and a current speed set point said extrudate flow controller comprising:
            calibration curve data stored in said memory; and
            instructions for receiving from an external control system a command for filament length and motor speed for a wirefeed extrusion system, and for determining said current temperature set point and said current speed set point as a function of said filament length and motor speed instructions, said current temperature set point and said current speed set point being determined by calculating a desired volumetric flow rate as a function of said filament length and motor speed instructions, and by referencing said calibration curve to determine said set points.

* * * * *